(12) United States Patent
Mouskis (10) Patent No.: US 8,720,502 B2
(45) Date of Patent: May 13, 2014

(54) NOZZLE FOR A REFUELLING PROBE

(75) Inventor: Christopher Mouskis, Dorset (GB)

(73) Assignee: Flight Refuelling Limited, Wimborne, Dorset (GB)

( * ) Notice: Subject to any disclaimer, the term of this patent is extended or adjusted under 35 U.S.C. 154(b) by 411 days.

(21) Appl. No.: 13/145,466

(22) PCT Filed: Jan. 21, 2010

(86) PCT No.: PCT/GB2010/000090
§ 371 (c)(1),
(2), (4) Date: Jul. 20, 2011

(87) PCT Pub. No.: WO2010/084316
PCT Pub. Date: Jul. 29, 2010

(65) Prior Publication Data
US 2012/0018039 A1    Jan. 26, 2012

(30) Foreign Application Priority Data
Jan. 21, 2009   (GB) .................................. 0900989.5

(51) Int. Cl.
*B65B 1/04* (2006.01)
*F16L 37/34* (2006.01)
*F16L 29/00* (2006.01)
*F16L 37/413* (2006.01)

(52) U.S. Cl.
CPC ............... *F16L 37/413* (2013.01); *F16L 29/00* (2013.01)
USPC ...... 141/382; 141/302; 141/387; 137/614.03; 251/149.8

(58) Field of Classification Search
CPC ................................ F16L 29/00; F16L 37/413
USPC ...................... 141/302, 382, 387; 137/614.03; 251/149.8
See application file for complete search history.

(56) References Cited

U.S. PATENT DOCUMENTS 2,815,226 A    12/1957   Rowland et al.
3,059,895 A *  10/1962   Brown ........................ 251/149.7
(Continued)

FOREIGN PATENT DOCUMENTS

GB         739897 A       11/1955
WO     20080145970 A2    12/2008

OTHER PUBLICATIONS

International Preliminary Report on Patentability and Written Opinion, issued Jul. 26, 2011, for International Application No. PCT/GB2010/000090 filed Jan. 21, 2010.

(Continued)

*Primary Examiner* — Timothy L Maust
(74) *Attorney, Agent, or Firm* — Heslin Rothenberg Farley & Mesiti, P.C.; Victor A. Cardona (57) ABSTRACT

A nozzle includes a nozzle body having a nozzle tip for engaging a fuel hose coupling, the tip extending from the body, and a valve sleeve for opening and closing a fuel path between the tip and the body. The tip is mounted within the body on a flexible shaft, so as to accommodate misalignment between the nozzle and the fuel hose coupling. This eliminates the need for a bearing at the end of the shaft, which causes a pressure drop in the nozzle. The shaft is axially slidable in the mounting in a first portion of the nozzle body. The first and second portions of the body are joined with a weak link, which is frangible in the event of excessive load, to release the abutment and allow the nozzle tip to travel towards the body and close the fuel path. Thus a separate shut-off valve is not required. Also a pressure regulator sleeve moves out of the nozzle body towards the nozzle tip in the event of excessive fuel pressure.

19 Claims, 14 Drawing Sheets

(56) References Cited

U.S. PATENT DOCUMENTS

| | | | |
|---|---|---|---|
| 3,475,001 A | * | 10/1969 | Hieber ............... 251/149.8 |
| 3,851,852 A | * | 12/1974 | Blanchard et al. ......... 251/149.1 |
| 3,976,100 A | | 8/1976 | Souslin |
| 5,634,505 A | * | 6/1997 | Wong ............... 141/349 |
| 6,250,348 B1 | * | 6/2001 | Reinholdt ............ 141/382 |
| 7,048,020 B2 | * | 5/2006 | Durieux et al. ........... 141/382 |
| 8,186,393 B2 | * | 5/2012 | Huegerich et al. ........... 141/294 |

OTHER PUBLICATIONS

GB Search Report Under Section 17 for corresponding priority Application No. GB0900989.5, dated May 14, 2009.
International Search Report for PCT/GB2010/000090 dated Dec. 2, 2010.

* cited by examiner

NOZZLE FOR A REFUELLING PROBE

CROSS REFERENCE TO RELATED APPLICATIONS

This application is a national stage of PCT International Application No. PCT/GB2010/000090, filed on Jan. 21, 2010, and published in English on Jul. 29, 2010, as WO 2010/084316, and which claims priority to GB 0900989.5 filed on Jan. 21, 2009, the entire disclosures of which are incorporated herein by reference.

This invention relates to a nozzle for a refueling probe. In air-to-air refueling, the aircraft to be refueled generally carries a nozzle mounted on the end of a refueling probe, which projects from the aircraft. The nozzle is arranged to be inserted into a reception coupling on a refueling hose. The hose is deployed from the tanker aircraft flying in front of the receiver aircraft.

Such a nozzle generally includes a valve which is arranged to open when the nozzle is engaged with the coupling, to allow fuel to flow from the hose through the nozzle and into the fuel tanks of the receiver aircraft. The hose coupling also includes a valve which is opened by the nozzle engaging therewith. The nozzle usually has a tip which is mounted on a shaft in the nozzle body, and has a journalled mounting which allows the shaft to "wobble" so as to accommodate small misalignments between the nozzle and coupling.

It is also necessary to ensure that, in the event of excess loads on the nozzle or probe, the structure will fail in a way which stops the flow of fuel, such that fuel being pumped out of the tanker does not escape in an uncontrolled manner. For example upon poor contact or excessively fast contact, the hose tends to whip, which can cause forces high enough to break nozzle off the probe.

Thus the probe is generally provided with a 'weak link' along which the end of the probe, including the nozzle, will break off in the event of excessive loading. It is then necessary to provide a further valve just upstream of the weak link on the broken probe end which is arranged to close when the weak link breaks. The hose and coupling can then detach from the receiver aircraft safely, with the end of the probe still attached to the coupling, and the fuel line closed.

Furthermore, it is desirable to regulate the pressure of fuel entering the probe, to protect the receiver aircraft components from over-pressure. This is generally done by providing a pressure regulator valve in the reception coupling.

Thus the structure of the probe and hose couplings is complex, and involves a significant pressure drop due to the various valve stages, as well as the presence of the nozzle tip mount in the channel, which are all provided in the fuel line. This is a disadvantage since it means that the fuel must be pumped at a high pressure to obtain the required pressure downstream of the probe. This invention aims to simplify the valve structure.

According to the present invention, there is provided a nozzle for a refueling probe, the nozzle comprising a body having a channel for fuel, a nozzle tip for engaging with a fuel hose coupling to open a fuel valve in the coupling, and a valve member having a first position in which an inlet fuel path between the body and the tip is closed, and a second position in which the inlet fuel path is open for allowing fuel flow from the hose coupling to the channel, the nozzle having a first body portion and a second body portion, and the nozzle tip being mounted to the first body portion so as to be movable to an inoperative position of the nozzle to close the fuel path, the second body portion comprising an abutment member for resisting the said movement of the nozzle tip towards the inoperative position, and a joint between the first and second portions, the joint being arranged to break when the nozzle experiences excessive loads, such that the nozzle tip is released from the abutment member and closes the fuel path.

Thus in an overload situation, the nozzle tip may travel axially inwardly of the nozzle, under the bias of the coupling valve closing, so as to seal the path at the open end of the nozzle body. Thus the end of the nozzle may break away with the fuel channel sealed leaving the remaining probe structure intact. This arrangement has the advantage that a separate shut-off valve in the probe is not needed.

Furthermore, the arrangement allows the nozzle, including the first and second body portions, to be provided as a removable unit for refueling probes. For example, the nozzle may screw into a probe tube. Thus the probe itself does not require a weak link, and is not damaged if the nozzle breaks. The nozzle may simply be replaced.

Preferably the nozzle tip is mounted to the body by a mounting member, the mounting member being resiliently flexible so as to allow non-axial movement of the tip, for accommodating misalignment between the nozzle and the coupling.

Thus when the nozzle is engaged in the coupling, the nozzle tip may deflect to take up loads caused by misalignment between the probe and the coupling. For example, US Military Specifications require that the nozzle tip should be able to deflect by 0.75 inches. This removes the need for a complex joint at the base of the tip shaft. Consequently, less space is required for structure in the fuel channel at the base of the shaft, which means that there can be a lower pressure drop in the system. With this simplified nozzle mounting, the abutment may simply bear against the end of the nozzle mounting member or shaft, which may be mounted so as to be axially moveable, for example in a spider.

The mounting member may be an axially extending shaft, and is preferably formed of a high strength material with a low stiffness such as titanium Beta C. This allows for a deflection of about 0.75 inches for a typical 6 mm diameter shaft. The body is conveniently in the shape of a hollow cylinder to provide the channel, and the shaft is preferably mounted to the body inside the channel, for example by means of a 'spider' of radially extending arms.

The valve member may be a valve sleeve, which is preferably also cylindrical in shape, fitting closely within the channel adjacent the open end thereof. The sleeve may be biased outwardly of the channel to abut against the nozzle tip, for example by a helical spring mounted around the edge of the channel. The outer surface of the tip may be substantially in the shape of a rounded cone, with the sleeve abutting the perimeter of the base thereof. Thus when the nozzle engages the coupling, the sleeve may be pushed back against the spring bias to open the channel by creating a path between the nozzle tip and the body.

The sleeve may have a smooth outside surface profile to reduce the risk of the nozzle snagging on the drogue canopy. Thus according to another aspect, the invention comprises a nozzle for a refueling probe, the nozzle comprising a body having a fuel channel, a nozzle tip, and a retractable sleeve between the body and the tip for opening and closing the fuel channel, the sleeve having an outer end for abutting the nozzle tip in the closed position, in which the outside surface of the sleeve has a smooth profile adjacent the outer edge thereof.

According to a further aspect of the invention, the nozzle comprises a regulator valve member which is biased towards an open position, for allowing the fuel path to be open, and which is operable upon the fuel pressure in the nozzle exceeding a predetermined level, to move to a closed position, restricting or closing the fuel path.

Providing pressure regulation in the nozzle has the advantage that the pressure at which the regulator valve closes can be chosen depending upon the aircraft to which the nozzle is to be fitted. Previously, a pressure regulator valve has been provided in the reception coupling and is therefore not able to be tailored to the requirements of the particular aircraft being refueled. This has meant that those aircraft with particularly delicate systems, such as helicopters, have needed additional regulator valves within the aircraft. Furthermore, the pressure regulation in the coupling has had to be at a compromise level, preventing aircraft with particularly robust systems from being refueling as fast as possible.

The member may be a further sleeve, and may be mounted coaxially with the valve sleeve. Conveniently, the regulator sleeve is mounted concentrically inside the valve sleeve. It may be biased towards an open position, contained within the valve sleeve, by a spring acting between the two sleeves.

The sleeve may have a surface in communication with or exposed to the fuel channel, so as to "see" the fuel pressure. This surface may for example be a radially extending annular surface of a collar. An opposite radial surface may be in communication with the atmosphere, so as to "see" the atmospheric pressure. The strength of the bias or spring is then chosen such that the sleeve will move against the bias when the fuel pressure exceeds a predetermined amount, under the action of the pressure difference seen by the opposing surfaces, to project out of the valve sleeve.

The invention may be more readily understood, reference will now made to the accompanying drawings, in which.

Figure 1:
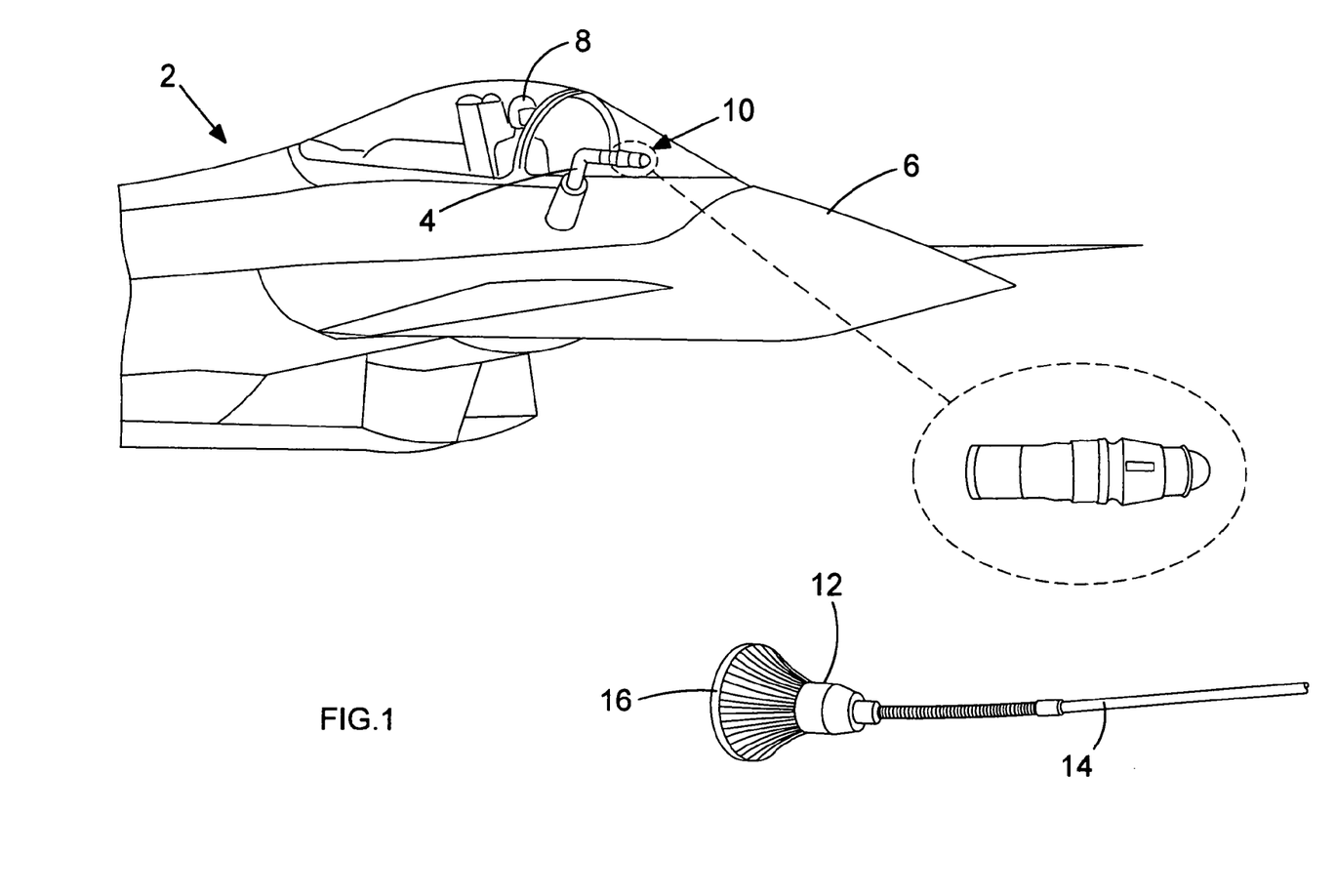
FIG. 1 is a picture of a receiver aircraft in-flight showing a refueling hose and drogue assembly trailing from a tanker aircraft (not shown)

Referring to FIG. 1, an aircraft 2 which is to be refueled in-flight carries a refueling probe 4 for transferring fuel into the fuel storage tanks of the aircraft 2. A probe 4 is mounted adjacent the nose 6 of the aircraft 2, and in view of the pilot 8. A refueling nozzle 10 is mounted to the distal end of the probe 4. The nozzle 10 is arranged to fit into the reception coupling 12 of a hose 14 and drogue 16 arrangement, trailing from a tanker aircraft (not shown).

Figure 2:
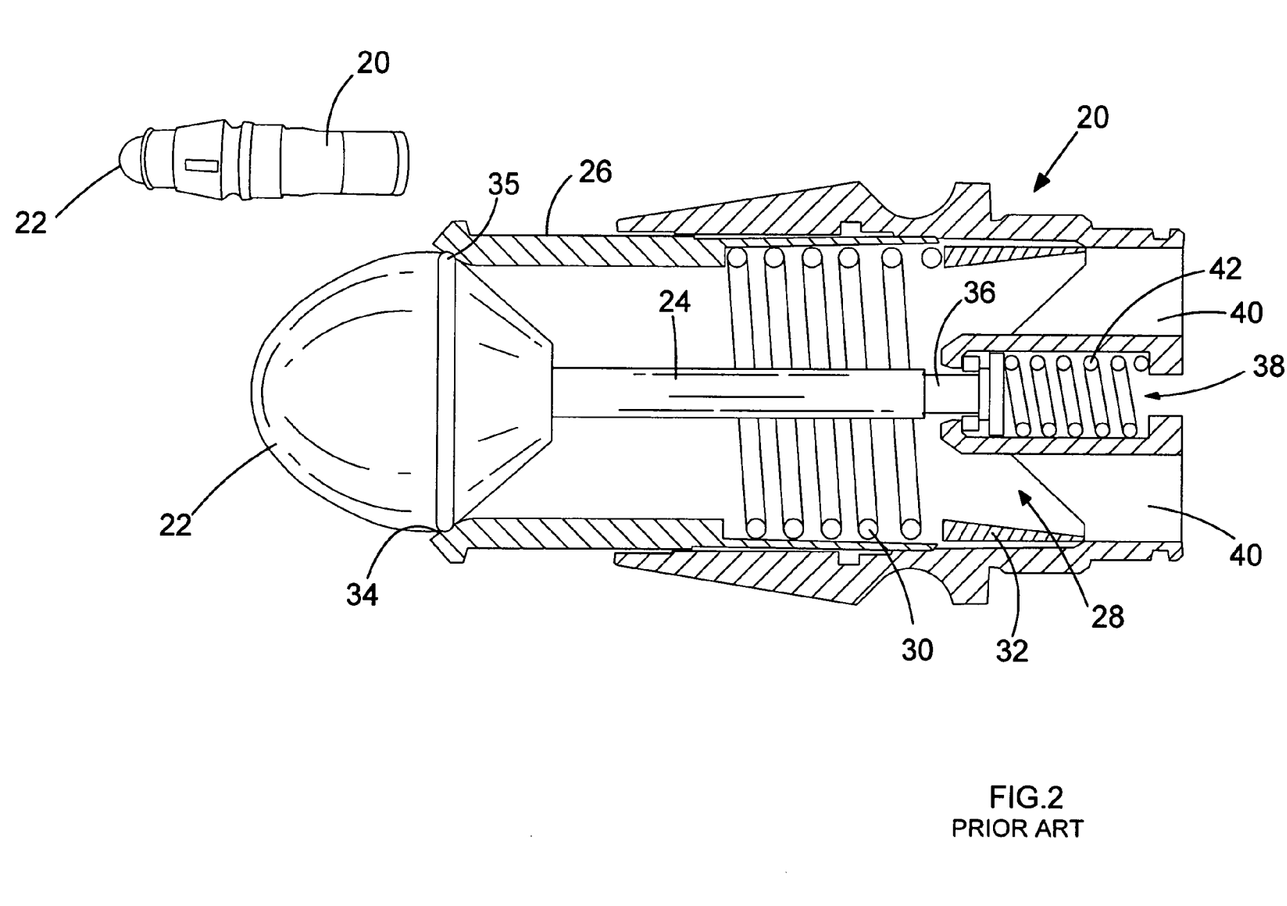
FIG. 2 is a cross-sectional side view of a probe nozzle according to the prior art.

Referring also to FIG. 2, the nozzle 10 has a shaped body portion 20. The body portion 20 is a hollow cylindrical member, forming a central channel 28 for carrying fuel. The nozzle has a tip 22, having a rounded conical shape, which extends out of the open end of the body 20. The tip 22 is mounted within the body portion 20 on a mounting member, which is an elongate axial shaft 24. A valve member is provided by a sleeve 26 which is movably mounted within the body portion 20, and can slide into and out of the open end of the body portion 20 to open and close a path for fuel between the body portion 20 and the nozzle tip 22.

A helical spring 30 is mounted between the sleeve 26 and an abutment 32 within the nozzle body to bias the sleeve 26 into the closed position of the valve as shown in FIG. 2. In this position, the sleeve 26 abuts the perimeter of the base 34 of the nozzle tip 22 to close the path and seal the channel 28 with a ring-shaped seal 35 mounted on the base 34 of the nozzle tip.

The base 36 of the tip shaft 24 is journalled within a chamber 38 formed in the centre of the channel 28, and mounted to the body portion 20 by means of a "spider" 40. The nozzle tip 22 is biased outwardly of the nozzle by means of a tip spring 42 bearing against the shaft base 36, which is able to "wobble" within the chamber 38 such that the nozzle tip may deflect slightly, in the radial direction, in order to accommodate small misalignments between the nozzle and the reception coupling.

Figure 3:
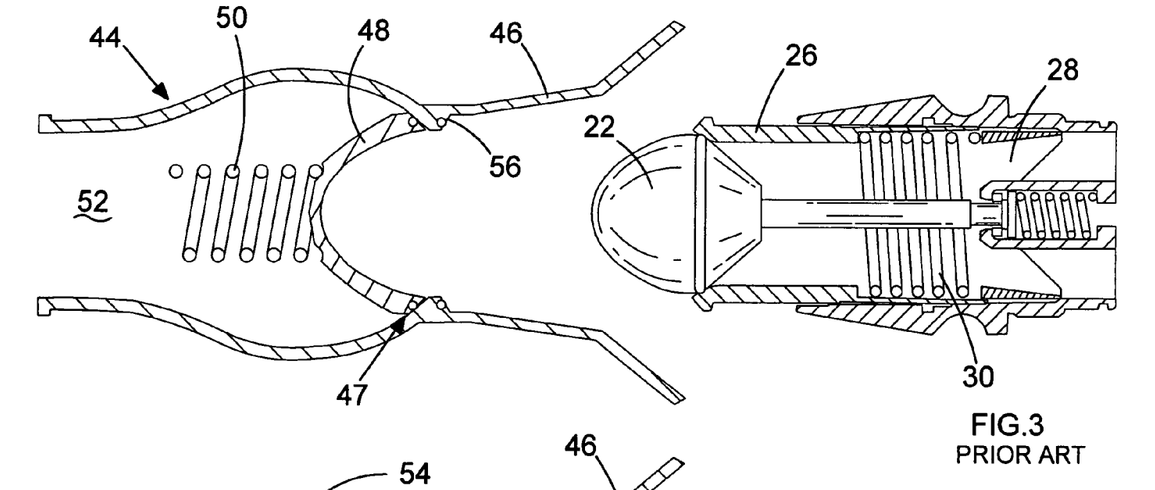
FIGS. 3 and 4 are cross-sectional side views of the prior art nozzle and reception coupling.
Figure 4:
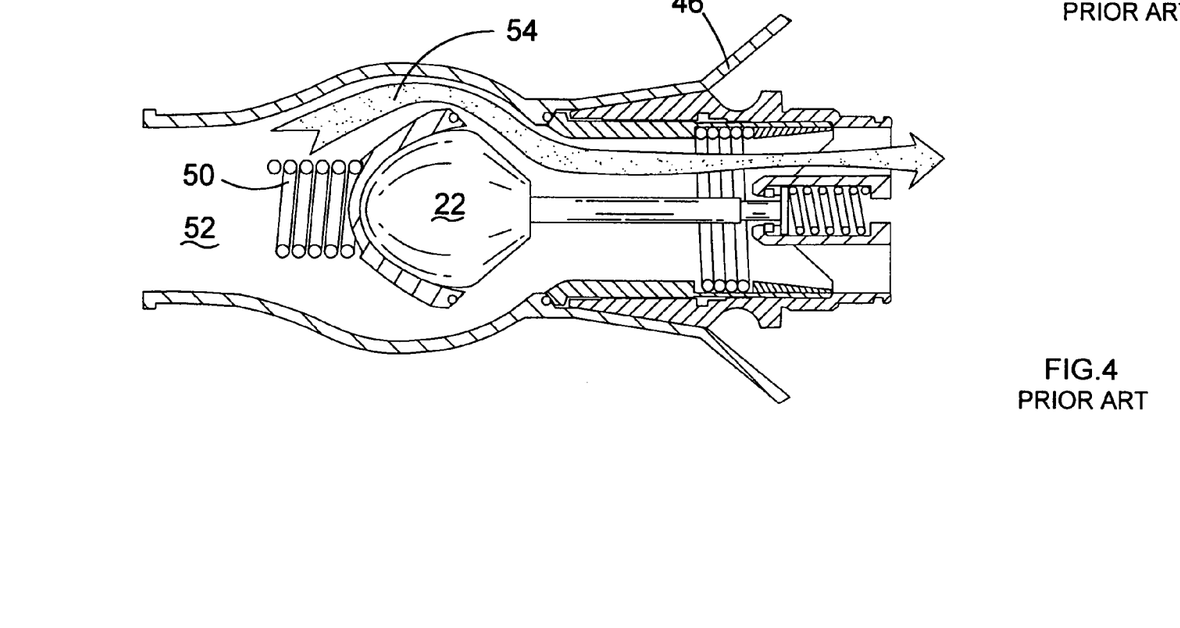

As can be seen from FIGS. 3 and 4, the reception coupling 44 comprising a funnel-shaped opening 46, inside which is a cup-shaped valve member 48. The valve member 48 is spring biased by a coupling spring 50 towards the funnel 46 so as to seal the fuel channel 52 around the inside perimeter of the funnel 46 with a ring-shaped coupling seal 47. The coupling valve member 48 is shaped to cooperate with the outside surface of the nozzle tip 22. Thus when the nozzle enters the coupling, the nozzle tip 22 pushes the coupling valve member 48 against the spring bias opening a coupling fuel channel 54 around the coupling valve member 48. Simultaneously an abutment 56 at the inside perimeter of the funnel 46 abuts against the sleeve member 26, and pushes it against the bias of the sleeve spring 30, opening a fuel path into the nozzle channel 28.

Figure 5:
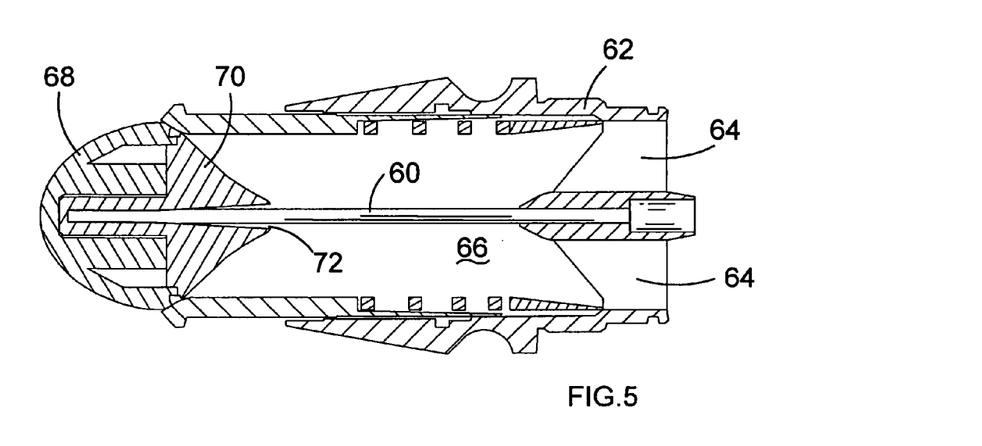
FIGS. 5 and 6 are cross-sectional side views of a nozzle suitable for use with the invention.

Referring now to FIG. 5, an improved nozzle suitable for use with the invention works in a similar manner to the prior art nozzle to engage with the reception coupling and open the fuel path. However, the mounting member for the nozzle tip is a flexible resilient shaft 60. The shaft is simply fixedly mounted in the nozzle body 62 by a spider 64, which takes up very little space in the fuel channel 66. The resilient shaft 60 is mounted to the base of the nozzle tip 68 in a conical mounting 70 having a converging aperture 72. This allows limited movement between the nozzle tip 68 and the shaft 60, when the shaft bends.

Figure 6:
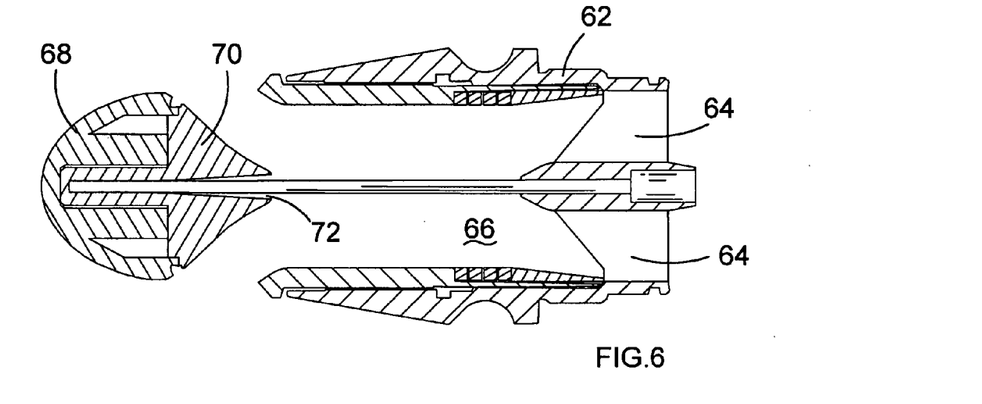
Figure 7:
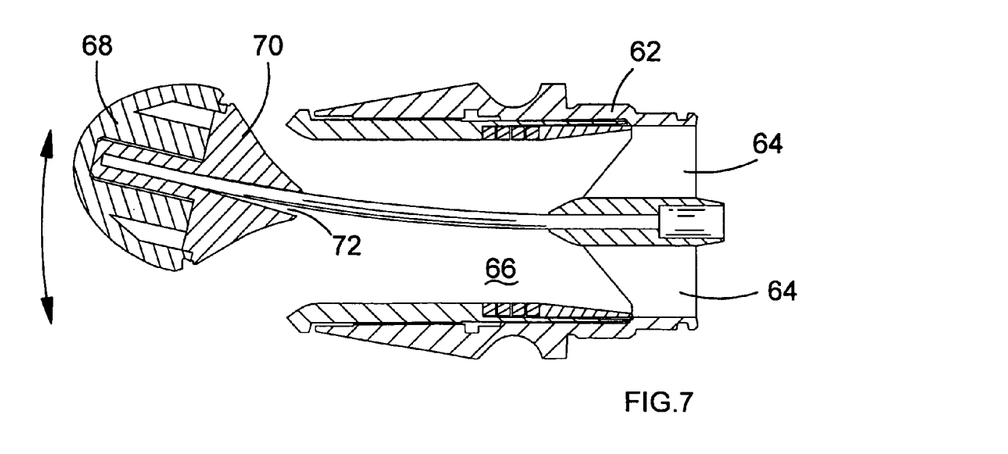
FIG. 7 is a further side view of the nozzle of FIGS. 5 and 6.
Figure 8:
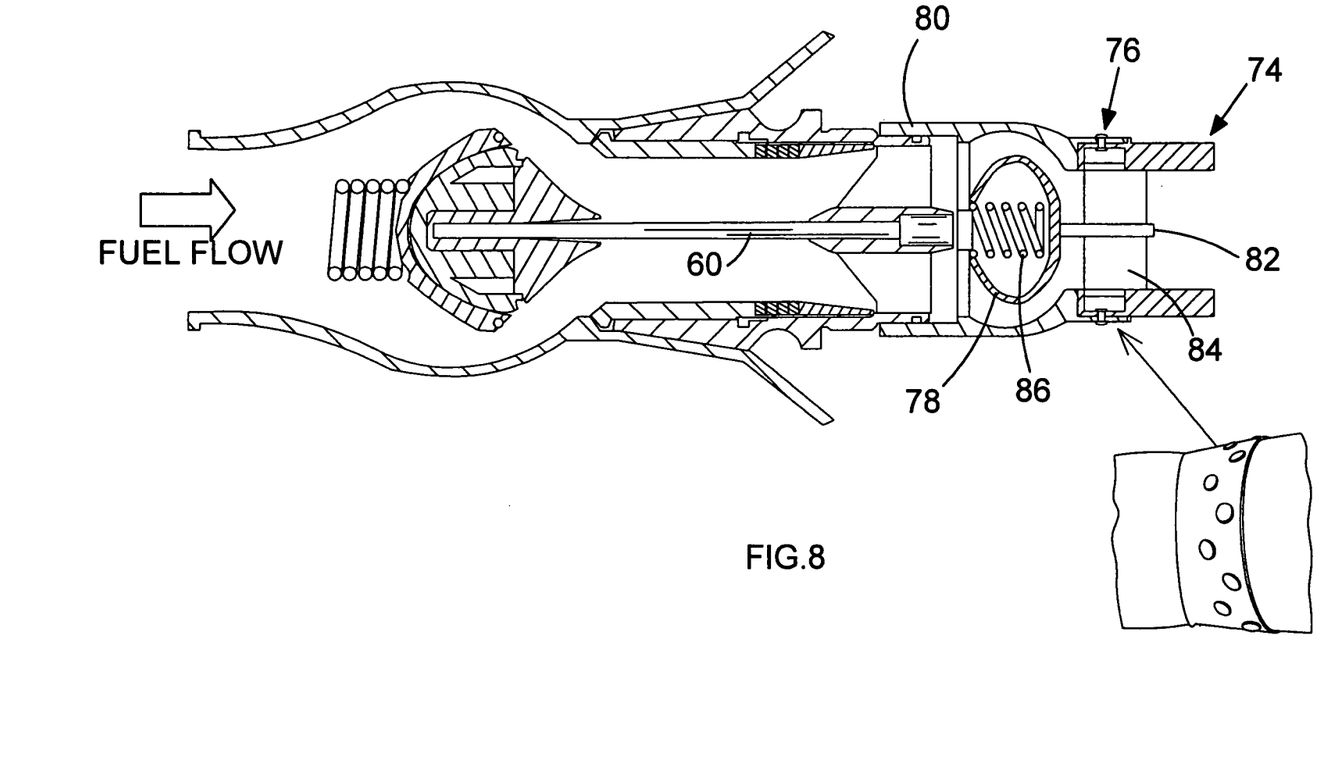
FIGS. 8 and 9 are cross-sectional side views of the nozzle of FIGS. 5 to 7 engaged with a reception coupling and a probe with a weak link.
Figure 9:
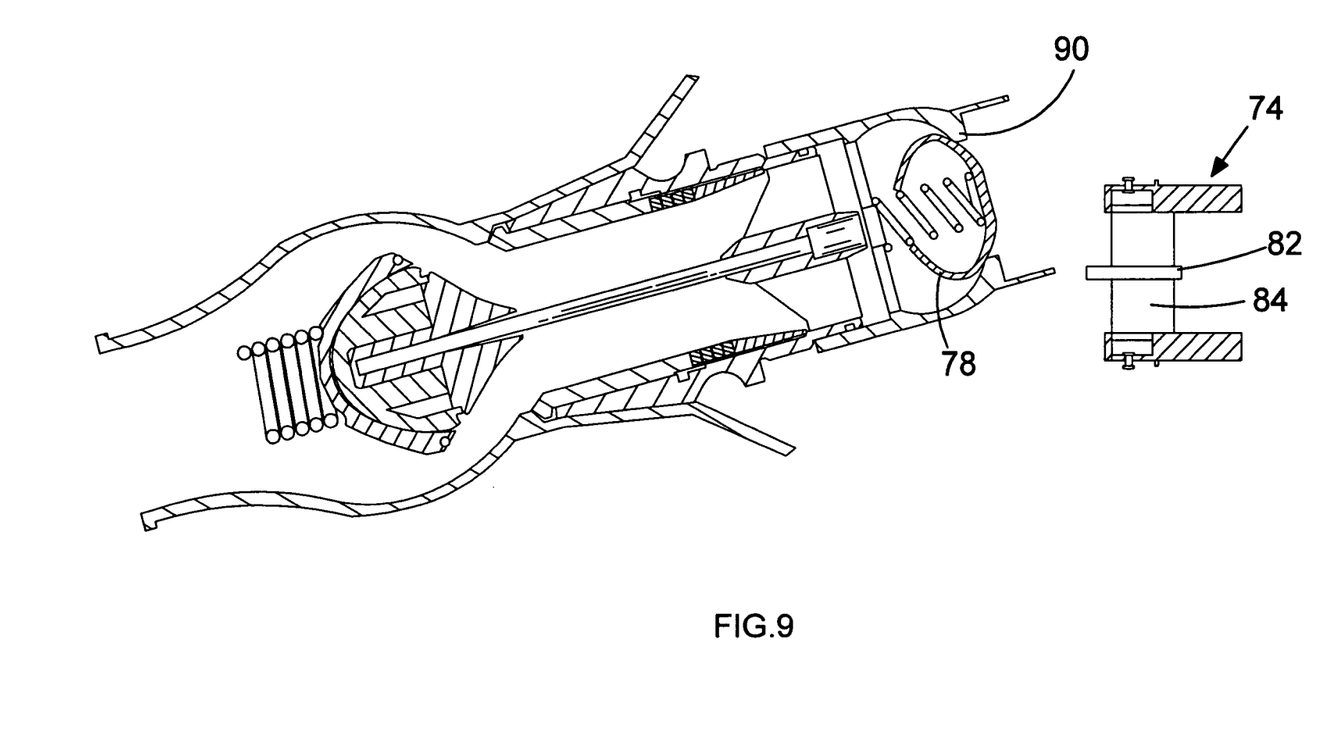

Referring now to FIGS. 8 and 9, the nozzle as shown in FIGS. 5 to 7 is shown mounted to a conventional probe 74, with a weak riveted joint 76. A probe valve member 78, which is for example a poppet valve, is mounted towards the distal end 80 of the probe 74, just downstream of the end of the nozzle tip shaft 60. The valve 78 is held in the open position (to allow fuel flow from the nozzle into the probe) by a valve abutment member 82, mounted in the probe channel by a spider 84. The abutment member 82 holds the poppet valve member 78 open against the bias of the poppet valve spring 86.

In the event of failure of the weak link 76, as shown in FIG. 9, the poppet valve 78 is detached from the abutment member 82 and released, to close the fuel path at the perimeter 90 of the channel adjacent the weak link. Thus fuel may not escape from the reception coupling, which detaches from the probe with the nozzle engaged.

Figure 10:
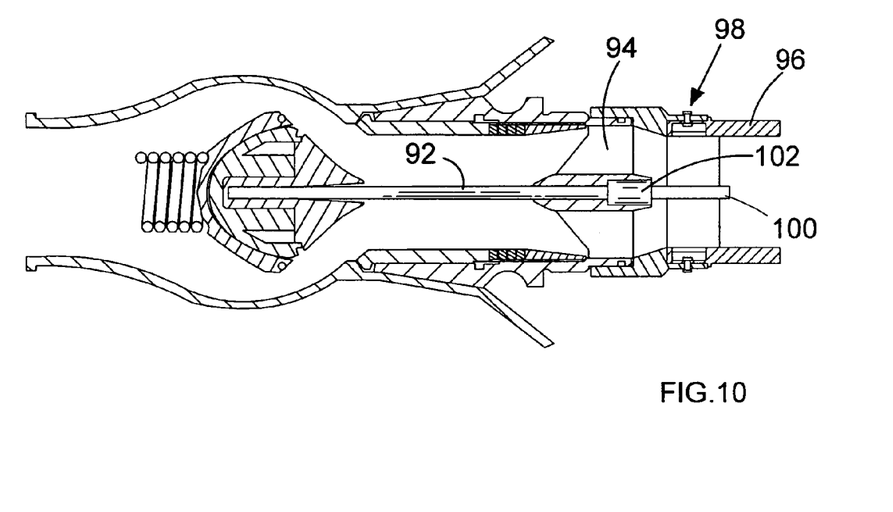
FIGS. 10 and 11 are cross-sectional side views of a nozzle according to one embodiment of the invention engaged with a reception coupling and connected to a probe.
Figure 11:
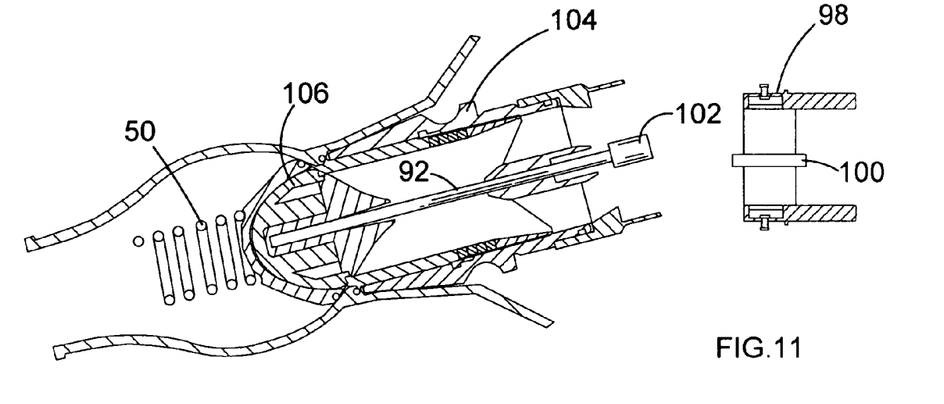

FIGS. 10 and 11 show an arrangement according to one embodiment of the invention, with a nozzle similar to that of FIGS. 5 to 7, except that the flexible shaft 92 of the nozzle is axially movable within the mounting spider 94. With this arrangement the poppet valve may be omitted. Instead, the nozzle may be attached to the probe 96 immediately adjacent the weak link joint 98. In this case the valve abutment member 100 may abut directly against the base 102 of the shaft 92. Now in the event of failure of the weak link 98, the base of the shaft 92 is released from abutment with the member 100. The shaft 92 is thus urged axially inwardly of the nozzle body 104 under the bias of the coupling spring 50, to an inoperative position of the nozzle in which the nozzle tip 106 moves into the nozzle body 104 to seal against the valve sleeve such that the fuel path is closed. Thus the bias of the coupling valve is sufficient to close the fuel path, eliminating the need for a further valve associated with the weak link.

Figure 12:
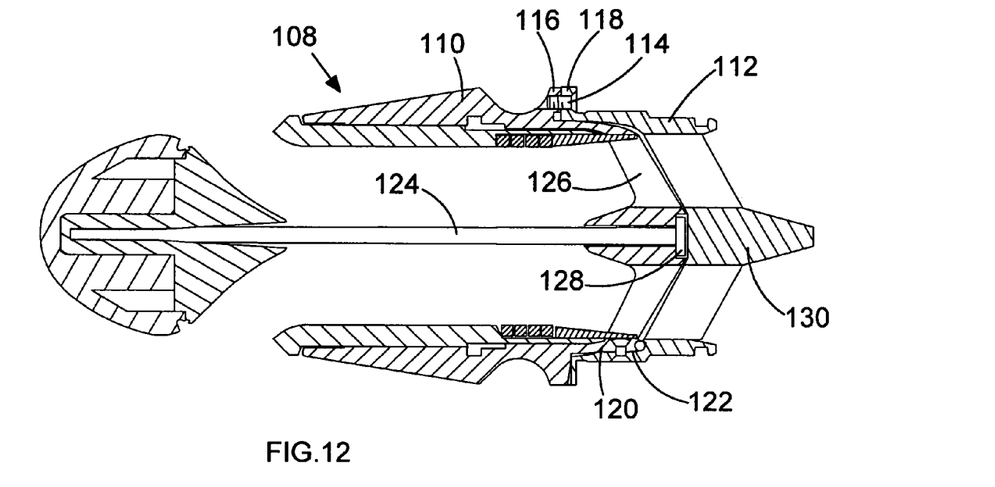
FIG. 12 is a cross-sectional side view of a nozzle according to an alternative embodiment of invention.
Figure 13:
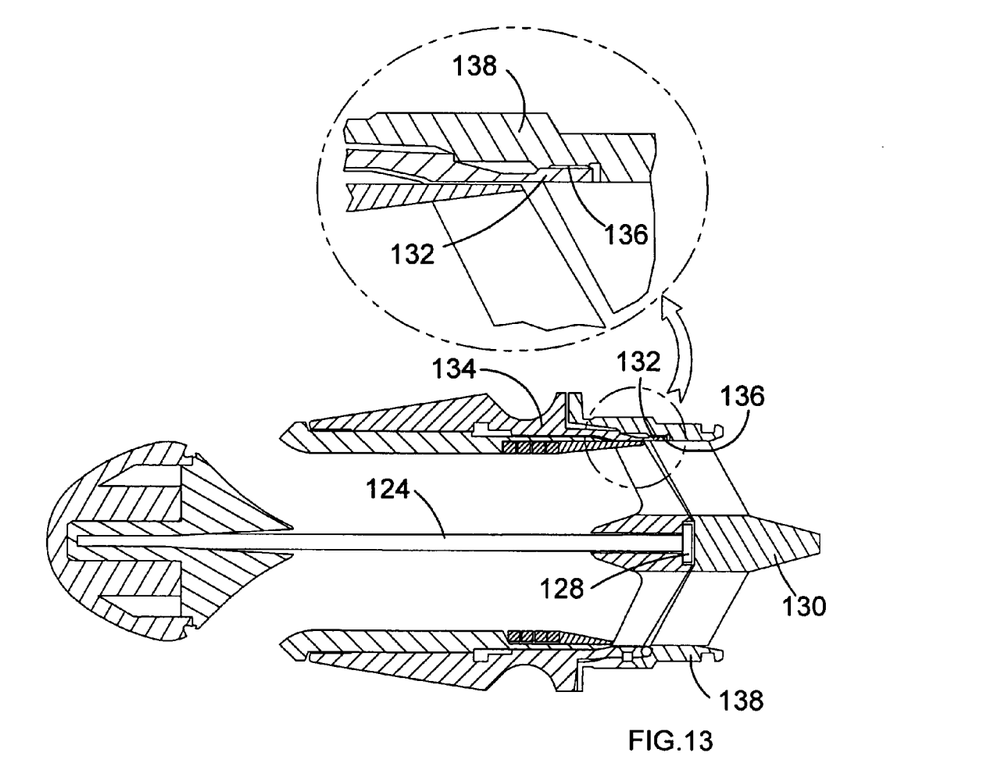
FIG. 13 is a cross-sectional side view of another alternative embodiment of a nozzle according to the invention.

Another development of the invention is shown in FIG. 12. The nozzle 108 works in a similar way to the nozzle shown in FIGS. 10 and 11, but with the weak link incorporated into the nozzle, such that the nozzle can be inserted into a simple cylindrical end of a probe. The nozzle 108 comprises a first body portion 110 and a second body portion 112, which are joined together with a weak joint. This may be done with bolts 114 joining radially extending flanges 116, 118 on each of the body portions. Alternatively, there may be a riveted joint between adjacent overlapping walls 120, 122 of the two body portions. It can be seen that the flexible shaft 124 is similarly movably mounted in a spider member 126. The base 128 of the shaft 124 abuts a central abutment portion 130 of the second body portion 112. FIG. 13 shows an alternative weak link, wherein a thin cylindrical flange 132 extends from the end of the first body portion 134 into a corresponding cylindrical aperture 136 in the second body portion 138. The thin flange 132 is designed to fracture under excessive side loads.

Figure 14:
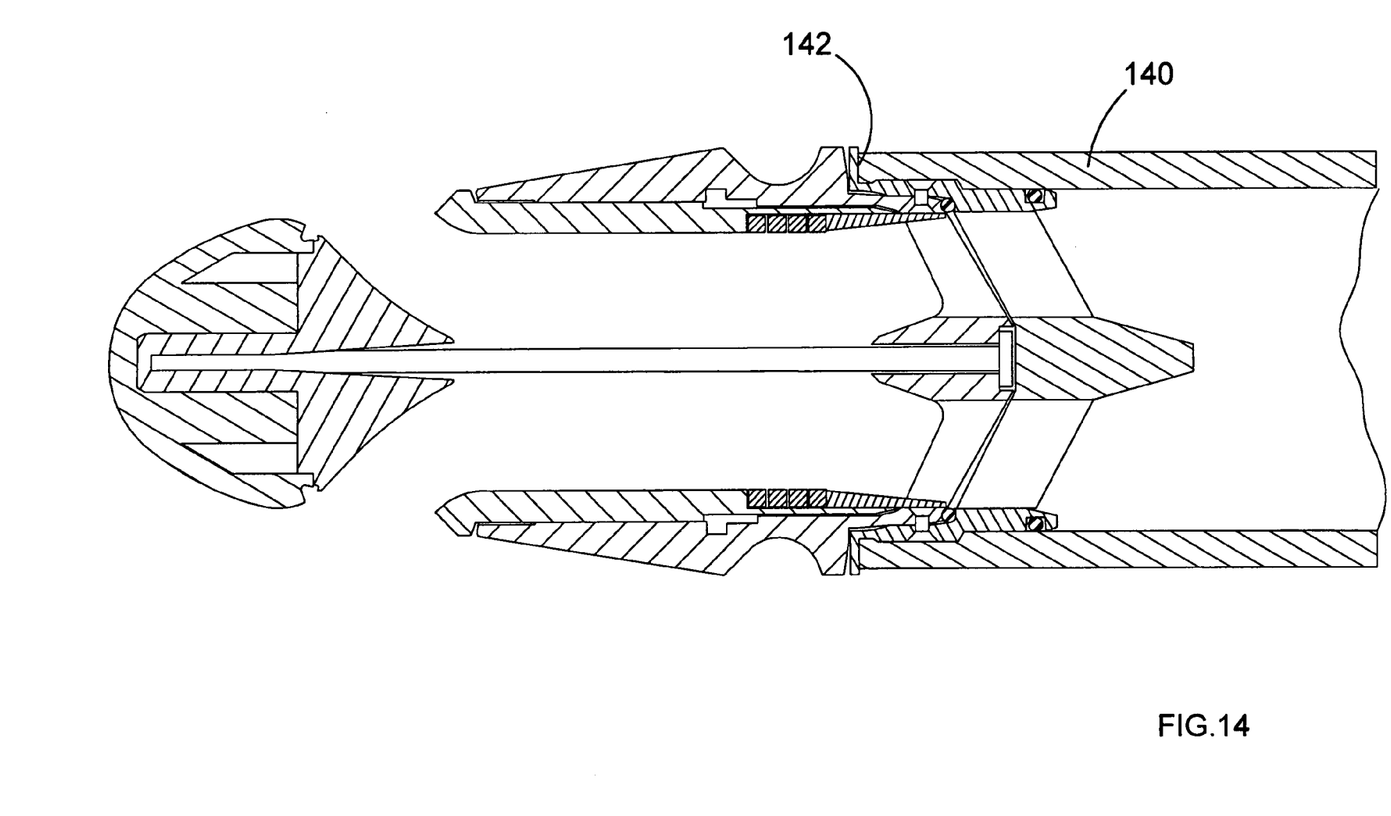
FIG. 14 is a further cross-sectional side view of the nozzle of FIG. 12, inserted in a probe.
Figure 15:
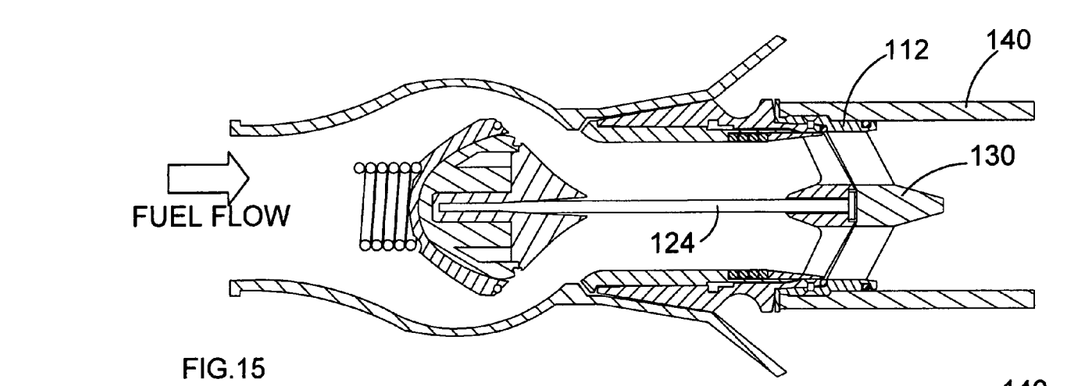
FIGS. 15 and 16 are further cross-sectional side views of the nozzle of FIG. 14 engaged with the reception coupling.
Figure 16:
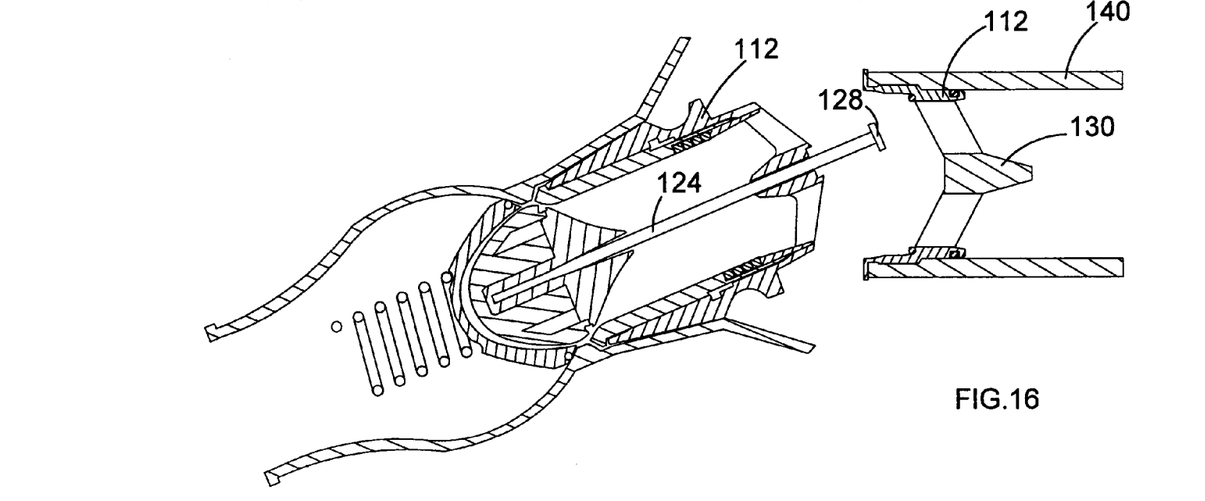

Whichever type of joint is used between the first and second body portions, it can be seen from FIG. 14 that such a nozzle can be simply secured in the cylindrical open end 142 of a probe tube 140, which does not need to include a weak link or a poppet valve. Referring now to FIGS. 15 and 16, in the event of failure of the weak link the base 128 of the tip shaft 124 will be freed from abutment with the central abutment 130 of the second body portion 112, which will remain inside the probe tube 140. Thus the reception coupling valve is free to close the fuel path, as described above, by pushing the nozzle tip back towards the nozzle body 110.

Figure 17:
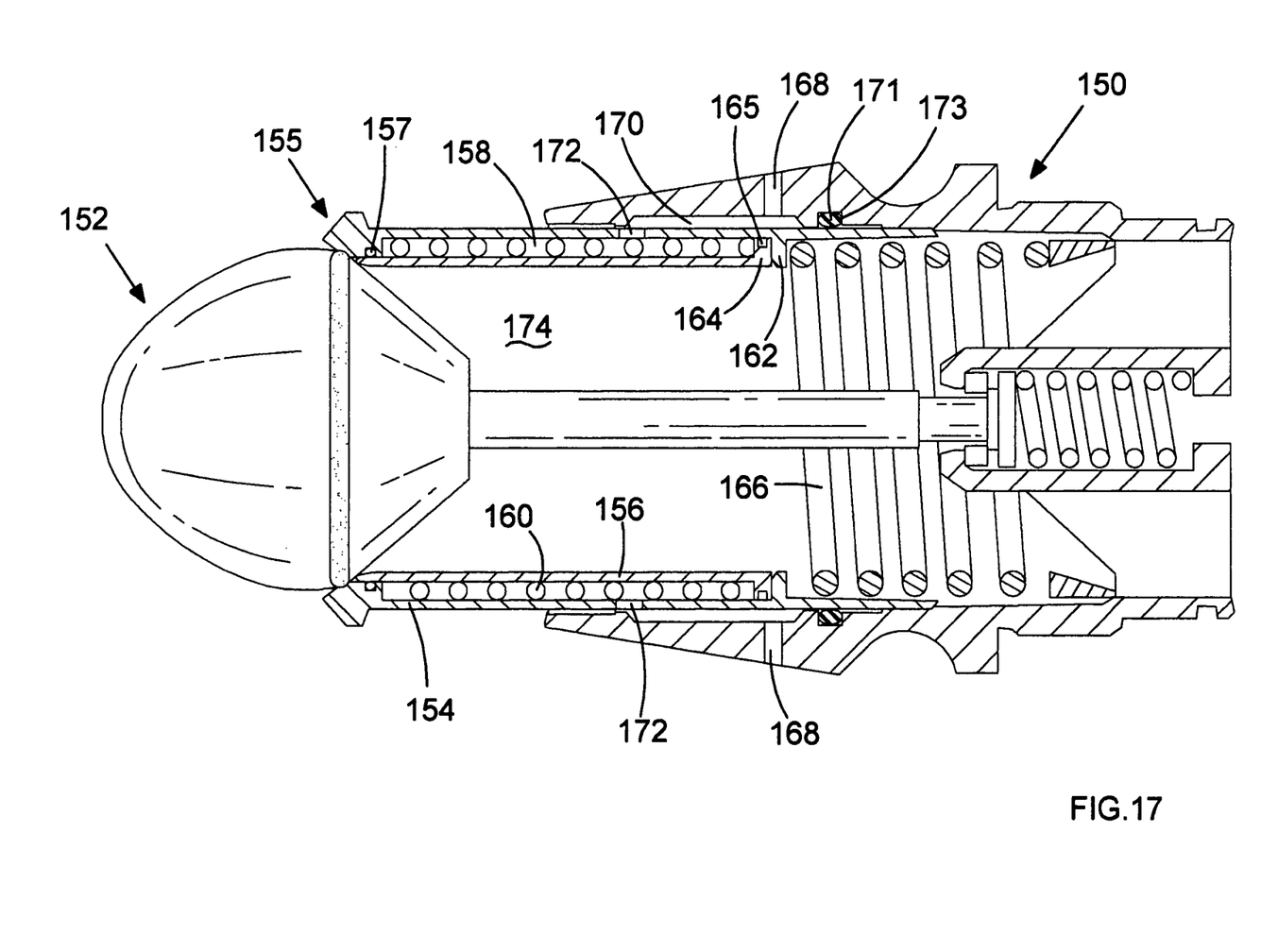
FIGS. 17 to 19 are further cross-sectional side views of a nozzle according to an embodiment of the invention.
Figure 18:
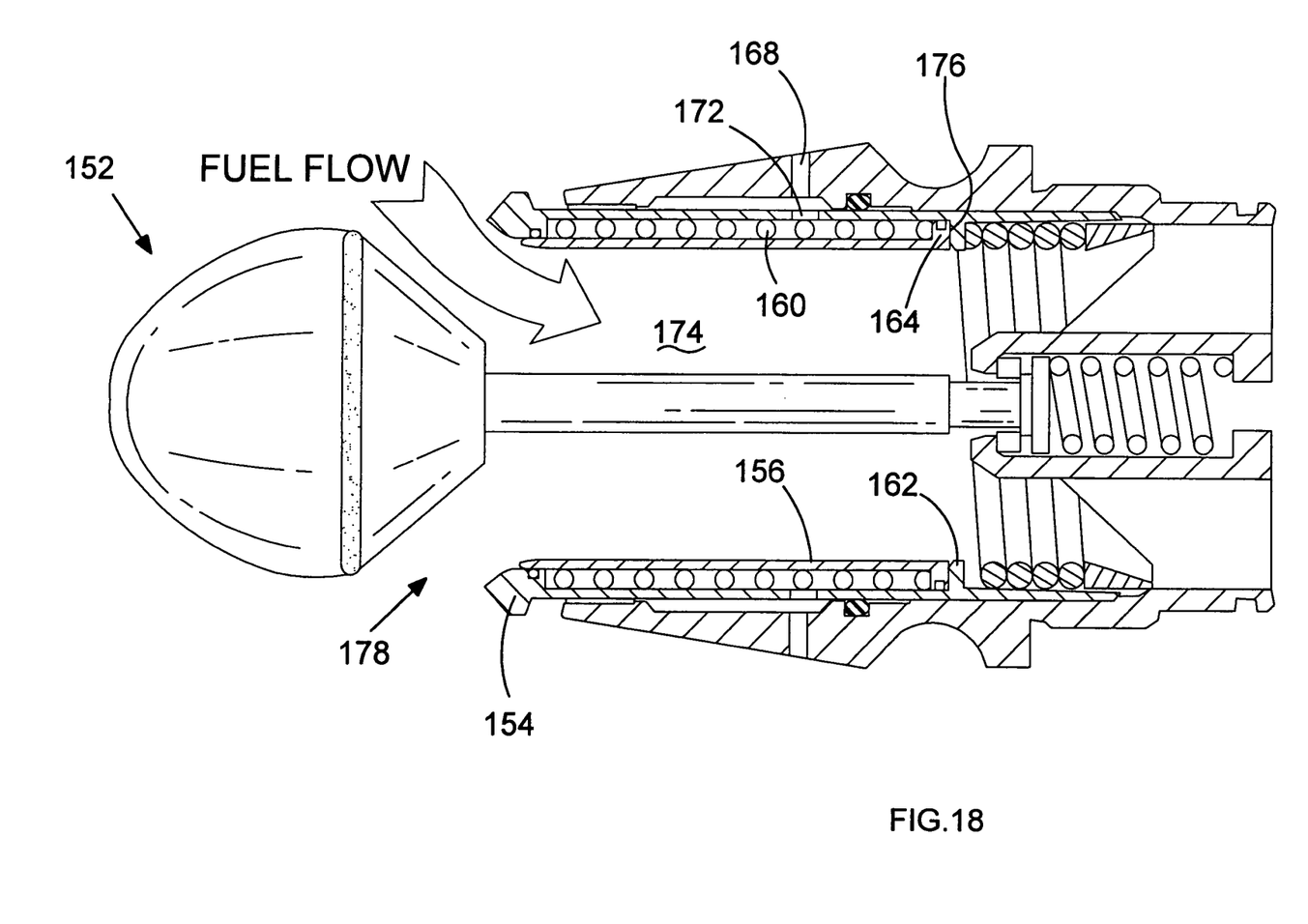
Figure 19:
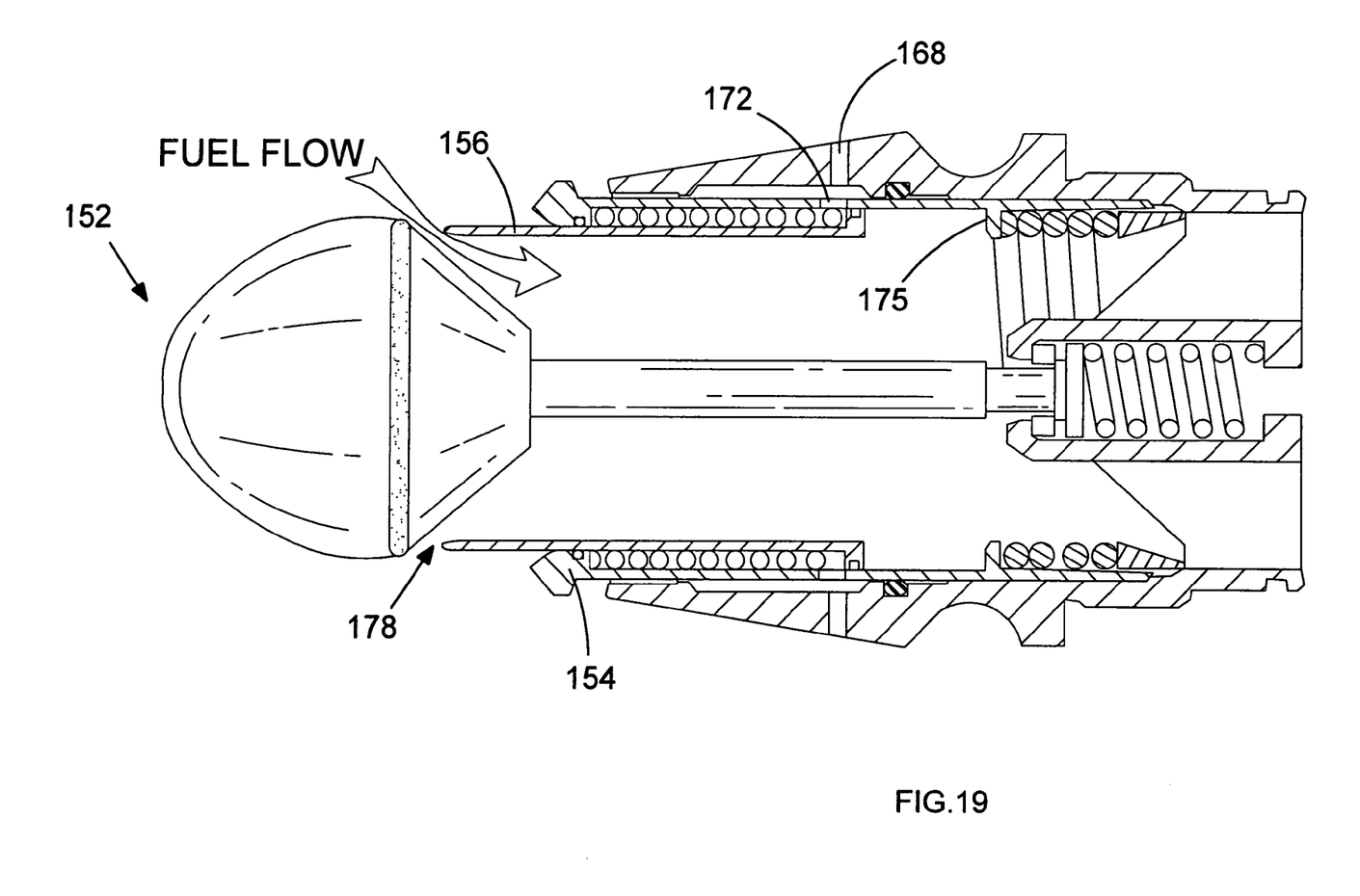

A still further development of the nozzle is shown in FIGS. 17 to 19, wherein the nozzle incorporates a fuel pressure regulator valve. The nozzle shown is similar to the prior art nozzles shown in FIGS. 2 to 4. The nozzle has a body portion 150, a nozzle tip 152, and a valve sleeve 154. In the development according to the invention, a further pressure regulator sleeve 156 is mounted concentrically and closely within the valve sleeve 154. The valve sleeve 154 has an annular recess 158 in which is mounted a regulator spring 160. The spring 160 biases the regulator sleeve 156 inwardly of the nozzle, to abut against an inwardly extending annular flange 162 of the valve sleeve 154, by bearing against an outwardly extending collar 164 of the regulator sleeve 156. The inwardly extending flange 162 of the valve sleeve 154 also serves to abut the valve spring 166, which biases the valve sleeve closed, as in the prior art.

The annular recess 158 is in communication with the atmosphere by means of plurality of bores 168 distributed around the nozzle body 150, which communicate via a thin annular chamber 170 in the nozzle body 150 with a plurality of apertures 172 in the valve sleeve 154. The chamber 170 is sealed from the fuel channel 174 by means of a seal 171 mounted in a seal recess 173 in the nozzle body 150 just downstream of the chamber 170, and bearing against the valve sleeve 154. Also the recess 158 is sealed from the fuel channel 174 by a first annular seal 157 towards the outer edge 155 of the valve sleeve 154, and a second annular seal 165 mounted towards the inner end of the regulator sleeve 156, both acting between the two sleeves 154, 156.

The fuel regulator valve works by differential pressure acting on the opposed surfaces of the collar 164. FIG. 18 illustrates the situation where the sleeve valve 154 is open under the action of engagement with the reception coupling, as described above in relation to the prior art, and a path for fuel is open into the fuel channel 174. In this condition, as in the closed condition of the valve sleeve 154 shown in FIG. 17, the regulator valve spring 160 holds the regulator sleeve 156 open against the flange 162.

In the event of overpressure in the fuel channel 174, the pressure seen by the outer surface 176 of the collar 164 exceeds the atmospheric pressure on the inner surface 175 enough to act against the bias of the regulator spring 160 to push the regulator sleeve 156 outwardly of the valve sleeve 154 to begin to close the fuel path 178, as shown in FIG. 19. This restricts the fuel flow into the fuel channel 174, thus decreasing the fuel pressure.

Figure 20:
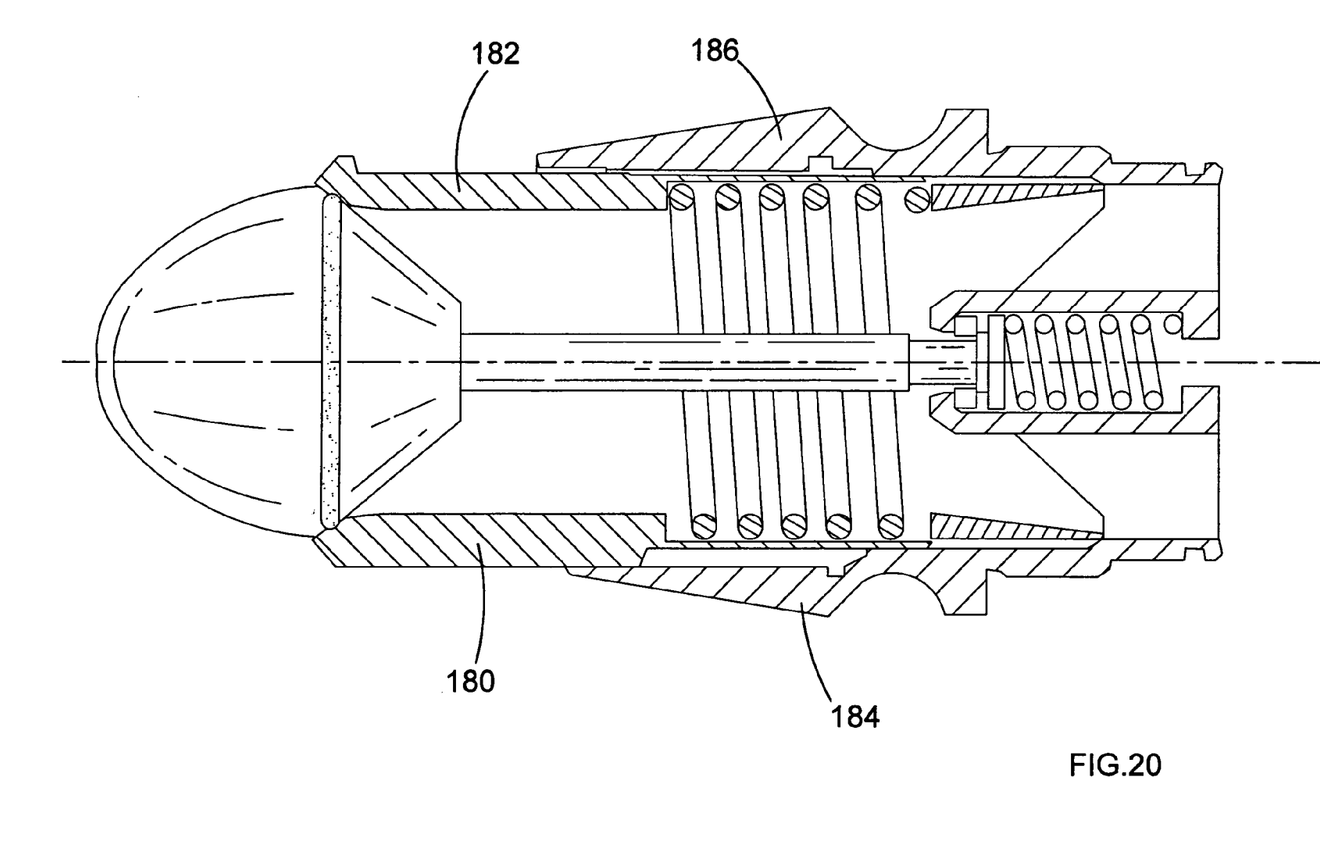
FIG. 20 is a further cross-sectional side view showing the nozzle according to yet another embodiment of the invention.

In FIG. 20 another development of the nozzle is shown. It has been discovered that it is possible to provide a valve sleeve 180 with a smooth outside surface profile, as shown in the lower half of the diagram of FIG. 20. At the outer end of the sleeve 180, the sleeve has the same cross-sectional dimensions as the prior art sleeve 182, shown in the upper half of the diagram, such that it meets the standard for fitting into a reception coupling. However the sleeve 180 of the invention remains of the same cross-sectional dimension along its length. Consequently the nozzle body 184 is made thinner than the prior art nozzle body 186 so as to fit within the coupling. Alternatively, the nozzle body may be made shorter. This helps to remove any problems with the sleeve snagging on the drogue during coupling or decoupling. In particular there is a tendency with some types of drogue for the sleeve to snag the canopy and tear it.

The invention claimed is:

1. A nozzle for a refuelling probe, the nozzle comprising:
   a body having a channel for fuel, a nozzle tip for engaging with a fuel hose coupling to open a fuel valve in the coupling,
   a valve member having a first position in which an inlet fuel path between the body and the tip is closed, and a second position in which the inlet fuel path is open for allowing fuel flow from the hose coupling to the channel, and
   a first body portion and a second body portion, and the nozzle tip being mounted to the first body portion so as to be movable to an inoperative position of the nozzle to close the fuel path, the second body portion comprising an abutment member for resisting the movement of the nozzle tip towards the inoperative position, and a joint between the first and second portions, the joint being arranged to break when the nozzle experiences excessive loads, such that the nozzle tip is released from the abutment member and closes the fuel path.

2. A nozzle for a refuelling probe as claimed in claim 1, in which the nozzle tip extends from the body, and is axially movable towards the body to close the fuel path.

3. A nozzle for a refuelling probe, as claimed in claim 1, in which the nozzle tip is mounted to the body by a mounting member, the mounting member being resiliently flexible so as to allow relative movement of the tip, for accommodating misalignment between the nozzle and the coupling.

4. A nozzle for a refuelling probe as claimed in claim 3, in which the mounting member is axially movable, and the abutment member acts at a location which is one of at and adjacent the proximal end thereof.

5. A nozzle for a refuelling probe as claimed in claim 3, in which the mounting member is an axially extending shaft.

6. A nozzle for a refuelling probe as claimed in claim 1, in which the valve member is a valve sleeve mounted on the nozzle body for one of axial movement inwardly of the nozzle body and axial movement outwardly of the nozzle body.

7. A nozzle for a refuelling probe as claimed in claim 6, in which the valve sleeve is biased outwardly of the body to abut against the nozzle tip in the closed position thereof.

8. A nozzle for a refuelling probe as claimed in claim 7, in which the sleeve is arranged to be pushed back against the bias into the body when the nozzle tip engages the coupling, thereby opening the path between the nozzle tip and the body.

9. A nozzle for a refuelling probe as claimed in claim 6, in which the valve sleeve has a smooth outside surface profile.

10. A nozzle for a refuelling probe as claimed in claim 1, comprising a regulator valve member which is biased towards an open position, and which is operable upon the fuel pressure exceeding a predetermined level, to move against the bias towards a closed position, so as to effect at least one of restricting and closing the fuel path.

11. A nozzle for a refuelling probe as claimed in claim 10, in which the regulator valve member is a regulator sleeve, mounted for one of axial movement inwardly of the nozzle body and axial movement outwardly of the nozzle body.

12. A nozzle for a refuelling probe as claimed in claim 11, in which the valve member is a valve sleeve mounted on the nozzle body for one of axial movement inwardly of the nozzle body and axial movement outwardly of the nozzle body, and the regulator sleeve is mounted concentrically with the valve sleeve for one of movement with the valve sleeve and movement outwardly of the valve sleeve.

13. A nozzle for a refuelling probe as claimed in claim 10, in which the regulator valve member has a surface which is at least one of in communication with and exposed to the fuel channel, and an opposing surface in communication with the atmosphere.

14. A nozzle for a refuelling probe as claimed in claim 6, comprising a regulator valve member which is biased towards an open position, and which is operable upon the fuel pressure exceeding a predetermined level, to move against the bias towards a closed position, so as to effect at least one of restricting and closing the fuel path, in which the valve sleeve has a smooth outside surface profile.

15. A nozzle for a refueling probe, the nozzle comprising:
a body having a channel for fuel,
a nozzle tip for engaging with a fuel hose coupling, the nozzle tip extending from the body such that a path for fuel is formed between the body and the tip,
a valve member having a first position in which the path between the body and the nozzle tip is closed, and a second position in which the path between the body and the nozzle tip is open for allowing fuel flow from the coupling to the channel, and
a regulator valve member which is biased towards an open position, for allowing the fuel path to be open, and which is operable upon the fuel pressure in the nozzle exceeding a predetermined level, to move towards a closed position, so as to effect at least one of restricting and closing the fuel path.

16. A nozzle for a refuelling probe as claimed in claim 15, in which the regulator valve member is a regulator sleeve, mounted for one of axial movement inwardly of the nozzle body and axial movement outwardly of the nozzle body.

17. A nozzle for a refuelling probe as claimed in claim 16, in which the valve member is a valve sleeve mounted on the nozzle body for one of axial movement inwardly of the nozzle body and axial movement outwardly of the nozzle body, and the regulator sleeve is mounted concentrically with the valve sleeve for one of movement with the valve sleeve and movement outwardly of the valve sleeve.

18. A nozzle for a refuelling probe as claimed in claim 15, in which the regulator valve member has a surface which is at least one of in communication with and exposed to the fuel channel, and an opposing surface in communication with the atmosphere.

19. A nozzle for a refuelling probe as claimed in claim 15, in which the valve member is a valve sleeve mounted on the nozzle body for one of axial movement inwardly of the nozzle body and axial movement outwardly of the nozzle body, and in which the valve sleeve has a smooth outside surface profile.

\* \* \* \* \*